Feb. 26, 1952     G. F. FORSTHOEFEL ET AL     2,587,306
BOTTLE DISPENSING APPARATUS Filed Jan. 5, 1946     6 Sheets-Sheet 1

Fig-1

Inventor
Gregg F. Forsthoefel
Charles H. Newton
By Albert R. Henry
Attorney

Feb. 26, 1952     G. F. FORSTHOEFEL ET AL     2,587,306
BOTTLE DISPENSING APPARATUS Filed Jan. 5, 1946                                            6 Sheets-Sheet 2

Fig-2

Inventor
Gregg F. Forsthoefel
Charles H. Newton
By Albert R. Henry
Attorney

Feb. 26, 1952     G. F. FORSTHOEFEL ET AL     2,587,306
BOTTLE DISPENSING APPARATUS
Filed Jan. 5, 1946                                6 Sheets—Sheet 4

Inventor
Gregg F. Forsthoefel
Charles H. Newton
By Albert R. Henry
Attorney

Feb. 26, 1952    G. F. FORSTHOEFEL ET AL    2,587,306
BOTTLE DISPENSING APPARATUS

Filed Jan. 5, 1946      6 Sheets-Sheet 5

Inventor
Gregg F. Forsthoefel
Charles H. Newton
Albert R. Henry
Attorney

Feb. 26, 1952    G. F. FORSTHOEFEL ET AL    2,587,306
BOTTLE DISPENSING APPARATUS
Filed Jan. 5, 1946                                             6 Sheets—Sheet 6

Inventor
Gregg F. Forsthoefel
Charles H. Newton
By Albert R. Henry
Attorney

Patented Feb. 26, 1952

2,587,306

UNITED STATES PATENT OFFICE 2,587,306

BOTTLE DISPENSING APPARATUS

Gregg F. Forsthoefel, Adrian, and Charles H. Newton, Deerfield, Mich., assignors to Revco, Inc., Deerfield, Mich., a corporation of Michigan Application January 5, 1946, Serial No. 639,364

3 Claims. (Cl. 194—2)

This invention relates to an apparatus for dispensing bottled beverages or other packaged articles, and it has particular reference to a vending machine in which the articles may be kept under refrigerated conditions, and from which they may be successively withdrawn by a purchaser upon the insertion of a coin.

According to the present invention, there is provided a cabinet containing a refrigerated compartment in which the articles to be dispensed are stored and arranged for delivery, and a machine compartment in which is located the machinery necessary to provide the refrigeration effect, the whole apparatus therefore being self-contained, and a complete unit which may be readily installed at the point of use. The front of the cabinet, which also constitutes the main door, is provided with coin control means, an operating dial, and a dispensing opening, so that, upon the insertion of a coin, the purchaser may manipulate the dial in such a manner as to enable him to procure a bottle, or other package from the machine.

Within the refrigerated compartment of the cabinet is positioned a rotatable magazine, formed with cells each adapted to receive a bottle, together with storage space for additional bottles which may be later charged into the magazine, and also mechanism for effecting the rotation of the magazine upon the insertion of a coin. Other parts of the mechanism are mounted directly in the door itself, in such manner as to cooperate with the rotating mechanism when the door is closed, and to prevent operation in the event the magazine is empty.

The invention thus provides a vending apparatus from which the purchaser may procure the articles without the intervention of a salesman or attendant, and one in which the several parts or components may be effectively coordinated and made without undue expense. A detailed description of a preferred embodiment of the invention will be given in the following portions of this description, read in connection with the accompanying drawings, wherein:

Figure 1:
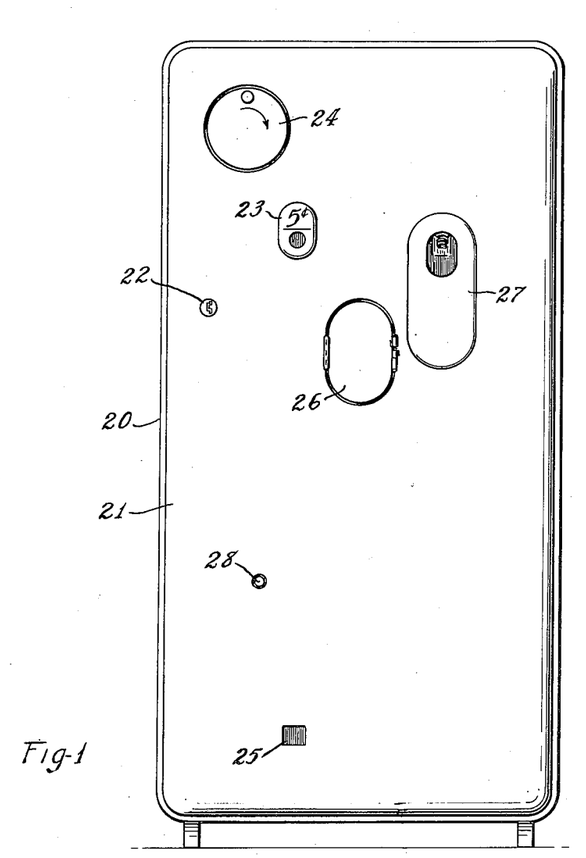
Fig. 1 is a front elevation of the dispensing machine as it appears to the purchaser, and showing the devices exposed on the face of the door panel.
Figure 2:
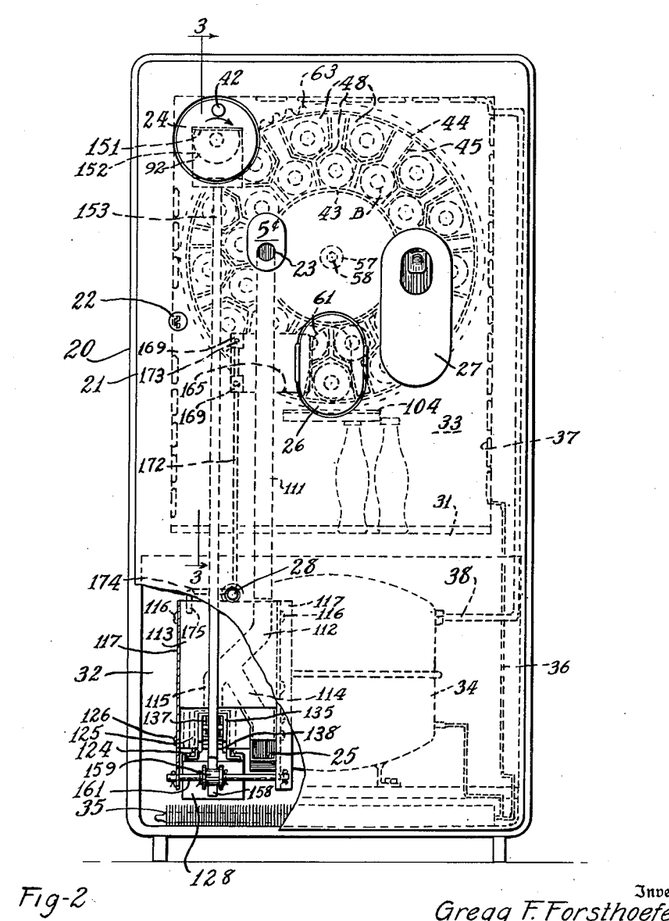
Fig. 2 is a view similar to Fig. 1, with a portion of the door broken away to show a part of the coin control mechanism, and also showing, in dotted lines, portions of the devices contained within the cabinet.

Referring first to Figs. 1 and 2, the apparatus comprises an upright cabinet 20 having a hinged door 21 extending over the entire face, and which may be secured in closed position by a conventional lock 22. The face of the door is equipped with a suitably marked plate 23, formed with an opening to receive a coin, and with an operating knob or dial 24 which may be rotated after the coin has been inserted and accepted by the machine. Should the coin be spurious, or if the machine is empty, it will be returned to the purchaser, who may retrieve it from a pocket 25 formed at the lower portion of the door. If the coin is accepted, the purchaser may then rotate the dial 24, which will have the effect of presenting a bottle, or other package, in line with a dispensing door 26. This may be opened by the purchaser to obtain his article. As it is intended that the machine will dispense such articles as soft drinks, the door is also provided with an inserted fitting 27, provided with a bottle cap remover and a receptacle for such caps. If the purchaser should, before operating the dial 24, elect to rescind his purchase, he may do so by pressing a button 28 on the face of the door, which, as hereinafter described, forestalls the operation of the coin control mechanism and diverts the money to the pocket 25.

Considering next the construction of the machine, the body of the cabinet 20 is formed with spaced inner and outer sheet metal walls, between which is disposed insulating material 29 (see Fig. 3), and with a horizontal deck 31 dividing the cabinet into two compartments 32 and 33. The lower compartment 32 constitutes a machinery compartment adapted to receive the compressor and condenser of a conventional refrigerating apparatus, while the upper compartment 33 is adapted to store, cool, and present the articles to be dispensed.

Inasmuch as the refrigerating apparatus is of known type, it need not be described in detail. Referring to Fig. 2, a motor-driven compressor 34, herein shown as a hermetic type, is mounted in the compartment 32 to deliver compressed refrigerant to a condenser 35 positioned transversely of the compartment. The refrigerant then flows through a supply line 36 into the convoluted coils 37 of an evaporator which are positioned against the inner wall of the upper compartment 33. The terminal end of the evaporator is connected through a return line 38 to the compresser, thereby completing the circuit. Automatic controls of known type may be utilized to govern the operation of the machine, and to maintain the temperature within the compartment 33 at a suitable low value to insure proper chilling of its contents. Air circulation through the machine compartment is provided through the open bottom of the cabinet, and a flue 39 secured to the back thereof, which extends approximately to the top.

Figure 3:
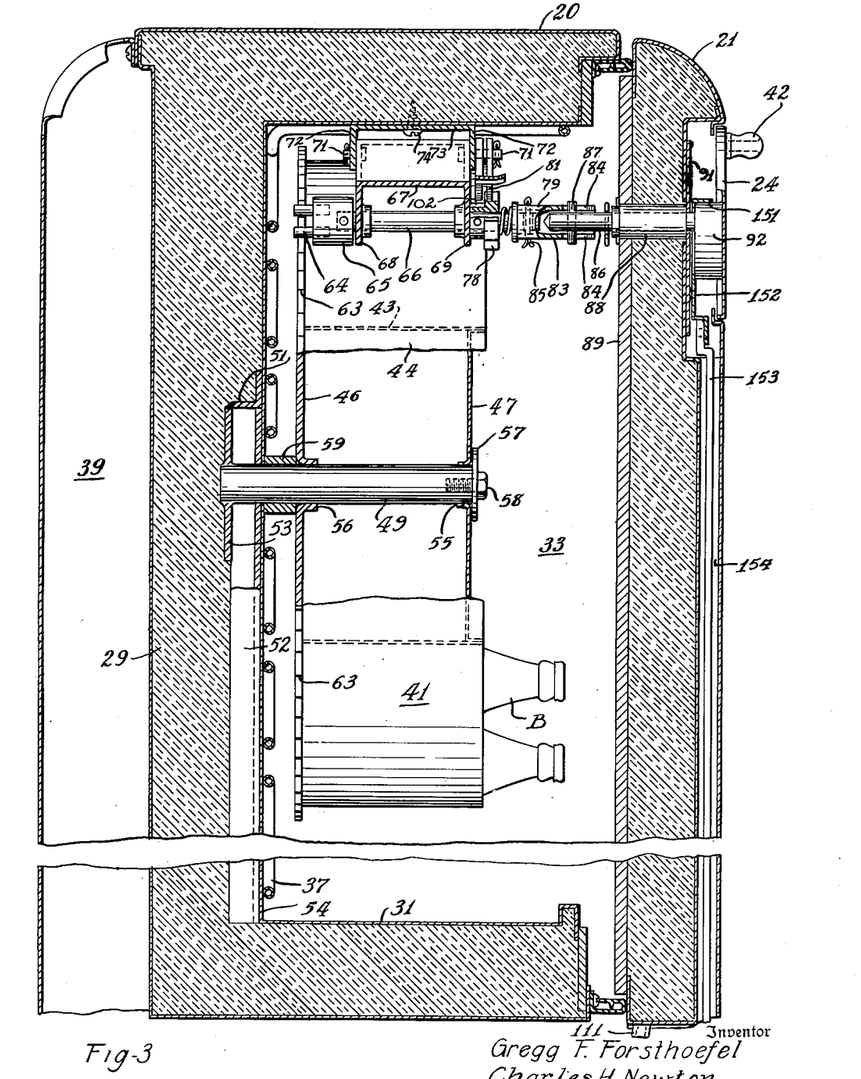
Fig. 3 is a section through the refrigerated compartment, taken substantially along the line 3—3 of Fig. 2, and drawn on an enlarged scale.
Figure 4:
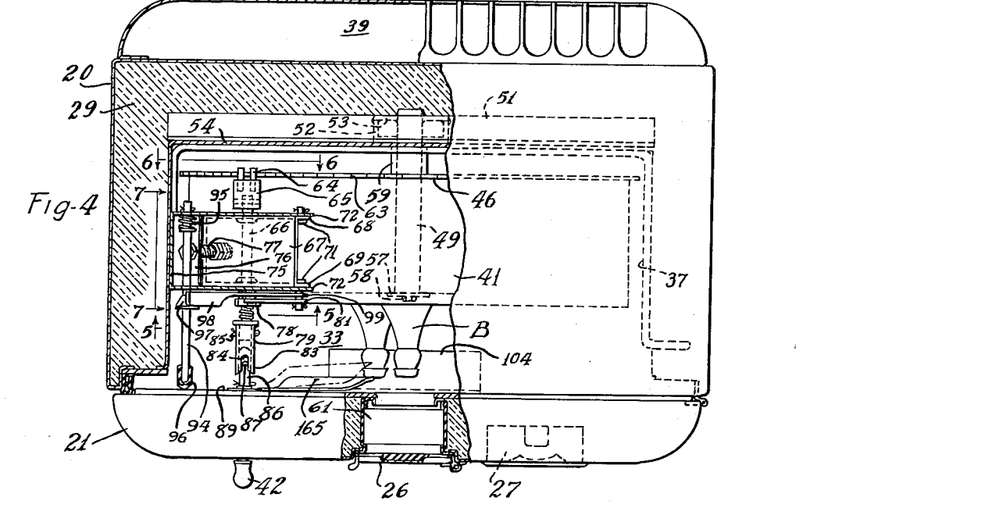
Fig. 4 is a top plan with portions broken away, further to show the disposition of the bottle magazine and its operating mechanism.

As shown in Figs. 2, 3, and 4, the refrigerated compartment 33 is also provided with a drum-shaped magazine 41 which, as previously indicated, is manually rotatable by means of the hand knob 42 on the dial 24. The magazine 41 comprises concentric inner and outer sheet metal cylinders 43 and 44 which are interconnected by Y-shaped, radially spaced, spokes 45, so located that the space between the arms of one spoke will accommodate one bottle laid on its side, and the space between adjacent spokes will similarly receive another bottle. The bottles are therefore mounted in the magazine in a series adjacent the inner cylinder 43, and another and staggered series adjacent the outer cylinder 44, and the angular distance between the bottles is uniform. The rear end of the magazine is covered with a circular plate 46, while the face of the magazine is provided with a plate 47 conforming to the diameter of the inner cylinder 43. The rear plate therefore provides a stop for the bottoms of the bottles B which are positioned in the cells 48 formed between the spokes 45 and the arms thereof. It will be noted, however, that the necks of the bottles extend beyond the face of the magazine, so that they may be readily grasped by the purchaser.

The magazine 41 is mounted for rotation on a horizontally positioned and forwardly extending fixed axle 49 secured to the rear wall of the cabinet 20. The axle is supported by means of a cross bar 51, mounted on two uprights 52, and between which are framed a pair of plates 53, the connections being effected by welding. The plates are formed with aligned apertures into which one end of the axle 49 may be welded. The framing pieces are let into the insulation 29 and are positioned in back of the liner 54 which constitutes the inner wall of the refrigeration compartment. The magazine is then mounted on the axle by means of centrally positioned and aligned bearing apertures, 55 and 56, respectively formed in the front and back plates 47 and 46, and it is retained thereon by a collar 57 secured to the axle end by a screw 58. Suitable spacing of the magazine from the liner 54 is effected by means of a washer 59.

It will be seen, particularly from Figs. 2 and 4, that the dispensing door 26 normally closes an elliptical openings 61 formed in the main door 21, so located as to reveal the lower portion of the magazine, and each series of cells therein, but of such limited width that only one bottle, from either the inner or outer row, can be withdrawn without rotation of the magazine as a whole. The arrangement is accordingly made such that, upon each complete operation of the dial 24, through its knob 42, the magazine 41 will be rotated through a small arc, which is sufficient to bring first a cell of one row, and then the adjacent cell of the other row, into alignment with the opening 61. In this manner, the bottles B are successively dispensed from the machine, but only one bottle can be obtained at one time.

The mechanism for rotating the magazine 41 includes a ring gear 63 formed on the periphery of the rear wall 46. The teeth of the ring gear are engaged by the staves 64 of a trundle 65, whose shaft 66 is connected to the dial 24 on the face of the door 21. Thus, upon rotating the knob 42, as, for example, in a clockwise direction, the magazine 41 will be rotated in a counterclockwise direction to present its cells 48 to the opening 61. The trundle gearing, while not today commonly used for most power transmission purposes, is quite advantageous here, inasmuch as it enables one to obtain a large gear reduction without resorting to intermediate gears. In the instant embodiment of the invention, the cells 48 are spaced at angular intervals of less than fifteen degrees, thereby to provide capacity for a case of twenty-four bottles at one time, together with spare cells so that cold bottles may always be available. The indicated gear reduction is therefore appreciable. Obviously, however, other forms of gearing may be utilized without departure from the principles of the invention.

Figure 5:
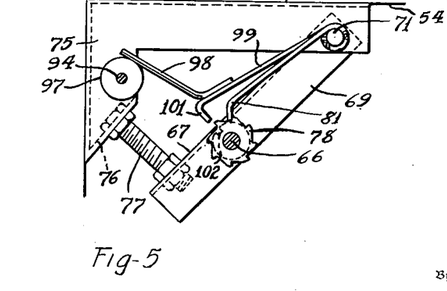
Figs. 5, 6, and 7 are details of the magazine operating mechanism, taken substantially on the correspondingly numbered section lines of Fig. 4.
Figure 6:
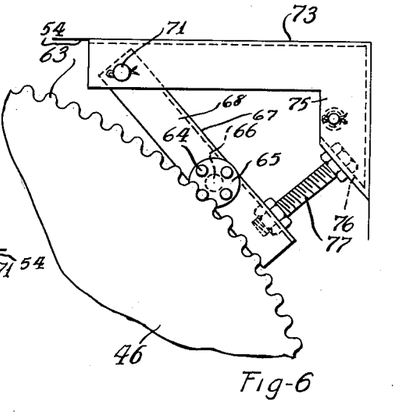

The trundle shaft 66 is rotatably mounted in a hanger 67, Figs. 3 and 4, formed as a wide channel whose depending flanges 68 and 69 are provided with aligned bearing apertures. The hanger is pivotally mounted at its upper end by means of pins 71 to the depending flanges 72 of a channel-shaped corner bracket 73, provided with angularly disposed legs, as shown in Figs. 5 and 6. The bracket 73 is secured to the top and side wall of the box in any suitable manner, as by means of screws 74, and it is so located as to overhang the front portion of the magazine 41. The vertical leg 75 of the bracket is also provided with a ledge 76 receiving a screw 77 extending to the lower portion of the hanger 67, thus providing means for adjusting and assuring the engagement between the staves of the trundle 65 and the teeth of the gear 63. When properly located, lock nuts on the screw 77 secure the hanger in a rigid position.

The forward end of the trundle shaft 66 projects beyond the flange 69 of the hanger 67, there to receive a ratchet wheel 78 and one portion of a coupling 79. As best shown in Fig. 5, the teeth of the ratchet wheel are engaged by a resilient pawl 81 secured to the proximate supporting pin 71, and they are so formed as to permit clockwise rotation of the shaft 66, but to restrain counterclockwise rotation.

The coupling 79 is provided to connect the shaft 66 to the dial 24. Inasmuch as the dial is carried by the door 20, which must be opened when providing service for the machine, it is desirable to provide a coupling of a quick detachable type. For this purpose, one end 83 of the coupling is formed as a sleeve provided with axial slots 84, and it is secured to the shaft 66 by means of a pin 85. The bore of the sleeve 83 is adapted to receive the inwardly protruding end of a stud 86 provided with radial pins 87 adapted to enter the slots 84. The stud in turn is rotatably mounted in a bushing 88, positioned between the inner panel 89 of the door 21 and a facing plate 91 which is recessed in the front thereof. The forward end of the stud 86 is fitted with a cam 92, whose function will be later described, and also with the dial 24.

Inasmuch as the knob 42 on the dial 24 is offset, it may be employed as a crank to rotate the dial, and thereby the stud 86, the coupling 79, and the shaft 66, to cause rotation of the magazine 41. The ratchet 78 and pawl 81, of course, enforce the rotation of the knob 42 in a clockwise direction, thereby causing a counter-clockwise rotation of the magazine 41. Bottles presented to the access door 26 therefore move in from the left as viewed in Fig. 2.

As the bottles are progressively dispensed, the magazine tends to rotate spontaneously, due to the torque exerted by the weight of the filled bottles on the left hand side. During periods of dispensing operation, such rotation cannot occur, because, as will be explained later, the cam 92 is so connected to other elements of the machine as to constitute a restraining influence. However, when the door is unlocked, free rotation could occur, because upon opening the door 21, the coupling 79 is automatically disengaged.

Figure 7:
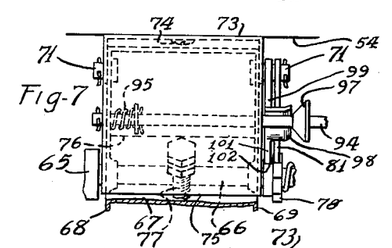

To prevent this effect, the vertical arm 75 of the bracket 73 is formed with two aligned bushings which receive a rod 94, normally urged in a forward position, or toward the door 21, by a spring 95 (see Figs. 4 and 7). The outer end of rod 94 extends almost to the inner panel 89 of the door 21, where it is fitted with a bumper 96 which abuts the panel 89 when the door is closed. When the door 21 is opened, the rod 94 slides forward under the urge of the spring 95, and when the door is closed, contact with the bumper 96 forces the rod inwardly. The rod 94 also has pinned thereto a conical cam 97 which normally engages a transversely disposed follower 98 projecting from the end of a resilient latch 99, pivotally mounted on the pin 71 adjacent the pawl 81. The free end of the latch 99 is formed with a detent 101 adapted to engage a recess 102 (Figs. 3 and 5) formed in the hub of the ratchet wheel 78. When the rod 94 is pushed in by the door 21, the cam 97 raises the latch 99 into disengaging position. When the door is open, the detent drops into the recess to lock the ratchet wheel and trundle shaft 66 against rotation in either direction. The magazine 41 is thus held stationary while being refilled.

It will have been observed from Fig. 2 that the magazine 41 is mounted toward the upper part of the compartment 33, to provide storage space for additional bottles not located in the magazine. In normal use, therefore, the attendant, after loading a case or more of bottles into the cells 48, will place other bottles on the deck 31, where they can be cooled before being inserted in the magazine for dispensing. Warm bottles just brought to the cabinet will therefore normally be placed in the precooling region before being charged into the cells. Inasmuch as the area of the opening 61 is more than twice the sectional area of a bottle, it is deemed advisable to secure an angle plate 104 to the panel 89, just below the opening 61, thereby providing a baffle precluding reaching into the locked cabinet and obtaining a bottle from the storage area.

Figure 8:
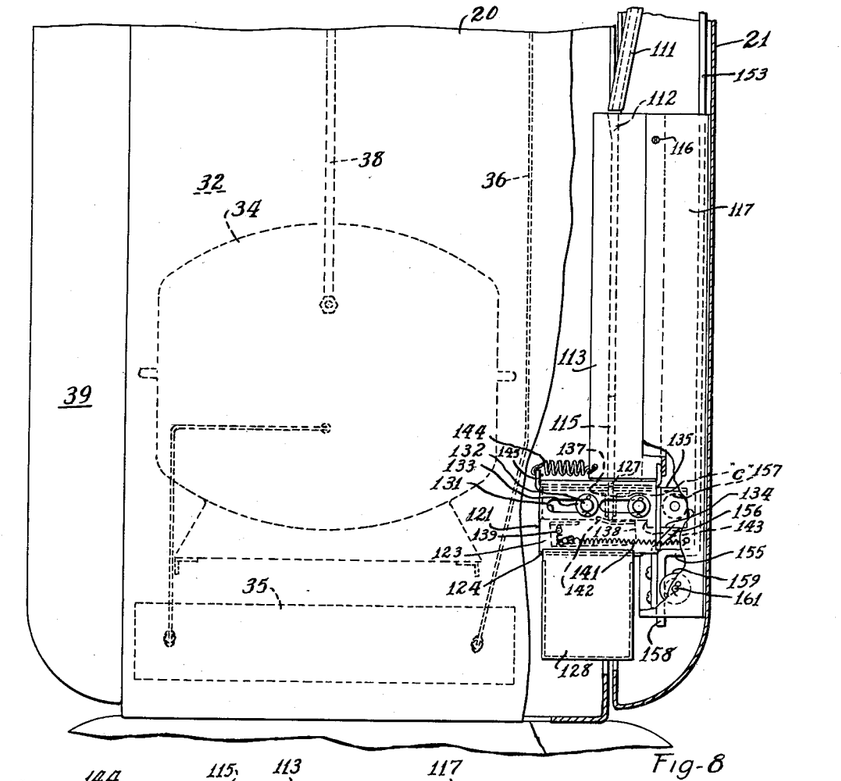
Fig. 8 is a side elevation of the lower portion of the cabinet, with portions broken away to show the coin control mechanism.

While the apparatus as described to this point may be utilized for various dispensing operations, it is further intended that the operation of the knob 42 shall be made subjected to coin control, as explained at an early point in this description. Generally considered, the coin control mechanism is of that type which provides a lock for the manually operated devices, and which lock may be released or freed by the insertion of a coin of appropriate denomination. As shown in Figs. 1, 2, and 8, the coin control devices are all carried in the lower portion of the main door 21, preferably below the level of the deck 31, and accordingly this section of the door need not be insulated.

As best shown in Figs. 2 and 8, the coin receiving pocket 23 on the face of the door 21 communicates with a duct 111 whose lower end abuts the coin entrance slot 112 of a detector mechanism, generally designated by the reference numeral 113. This unit, of generally rectilinear form, is frequently called a "slug rejector," and, as such, it forms no part of the present invention, being a well known article of commerce. It will suffice for the purposes of this description to state that, if a spurious coin or one of the wrong denomination is inserted in the coin-receiving pocket, the unit 113 will automatically divert it into a return duct 114 and thence into the pocket 25. If a satisfactory coin has been inserted, it will pass into a delivery duct 115 and thence out of the unit. While this unit may be omitted without departure from the principles of the present invention, it is a useful adjunct for a commercial vending machine. In the present embodiment, it is simply mounted within the door 21 by means of screws 116 to angle plates 117, which are welded to the inner face of the door.

Figure 9:
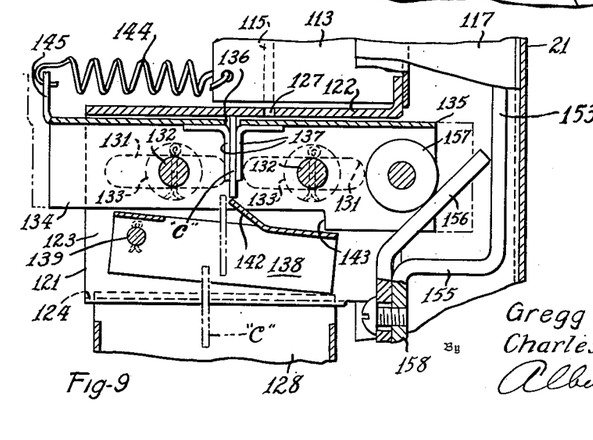
Fig. 9 is a fragmentary section taken through the coin control mechanism, drawn on a further enlarged scale, and illustrating one of the positions thereof.
Figure 10:
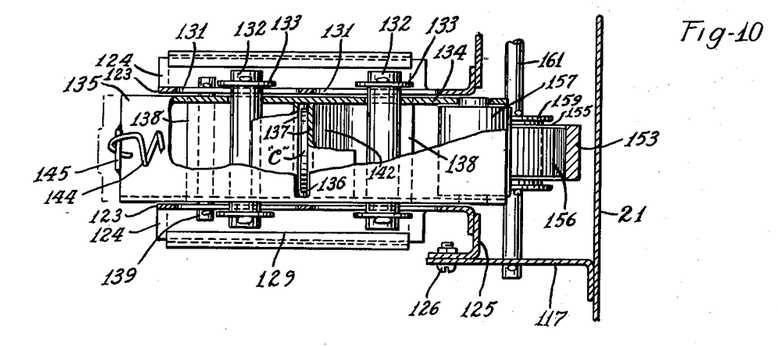
Fig. 10 is a plan of the mechanism shown in Fig. 9, portions being broken away and other portions being shown in section.

Referring next to Figs. 8, 9, and 10, there is shown a coin-actuated locking mechanism, including a saddle shaped frame 121 having a horizontal web 122, depending side flanges 123, and outwardly turned supporting ledges 124. This member is secured to the angle plates 117 by means of spacer pieces 125, which are welded to the saddle 121, and screws 126. The web 122 is formed with a transverse slot 127 aligned with the coin chute 115, so that a coin delivered by the detector unit 113 will pass through the saddle. The lower ledges 124 provide a support for a removable cash box 128 formed with complementary inwardly turned flanges 129. Coins passing through the slot 127 are received in the box 128, from which they may be periodically collected by an attendant when the door 21 is opened.

The side flanges 123 are formed with pairs of aligned slots 131 in which are mounted pins 132, secured against transverse displacement by washers 133. The pins pass through side flanges 134 of a channel shaped slide member 135, and thus support the slide from the saddle for linear movement toward and away from the door. The web of the slide member is provided with a transverse slot 136, normally aligned with the slot 127, as shown in Fig. 8. The under side of the web is provided with depending spaced guide flanges 137 adjacent the edges of the slot 136, so that a coin C entering the slot 127 will also pass through the slot 136, and be retained in vertical position by the flanges 137.

A latch member 138, also of channel shaped section, is pivotally mounted at one end, and below the slide 135, by a pin 139 passing through its side flanges and the side flanges 123 of the saddle 121. The latch is normally held with its web in a horizontal plane by a tension spring 141 connected between the pivoted end of the latch and the framing angle 117. The web of the latch therefore constitutes a stop for the coin C entering between the flanges 137 of the slide 135. The web is also cut through and turned up to provide an inclined cam 142 adjacent the supporting point for the coin C. Hence, if the slide 135, while containing a coin, is pushed forward, the coin will engage the cam 142 to depress the latch 138 until the coin falls through the latch, and thence into the cash box 128.

Appreciable motion of the slide 135 is prevented, however, unless a coin is in position, by shoulders 143 formed on the side flanges 134, and which may abut the end of the latch when it is in normal horizontal position. When a coin is inserted, initial forward movement of the slide causes the coin to engage the cam 142, and thereby depress its free end sufficiently to enable the shoulders to ride freely over the latch, as shown in Fig. 9. When the slide is withdrawn, the latch resumes its horizontal or locking position. The slide is normally urged to its initial position, shown in Fig. 8, by a tension spring 144 extending between a lug 145 on the end of the slide 135 and a suitable anchoring point on the detector unit 113, or other fixed part of the apparatus.

The slide 135 is mechanically interconnected with the dial 24 in such manner that operative rotation of the dial, and therefore rotation of the bottle magazine 41, is prevented unless a coin has been deposited on the latch 138. Reverting to Figs. 2 and 3, it will be recalled that the inner face of the dial is formed with a cam 92, cylindrical in shape but formed with a flat face 151. This face normally supports a slotted dished plate 152 to which is connected a rod 153, extending down through the door in a duct 154. When the rod 153 is free to move, rotation of the dial 24 simply lifts it vertically through the cooperation of the cam 92 and slotted plate 152. When the rod is held against movement, rotation of the dial is prevented by the engagement of the plate against the flat face 151.

As shown in Fig. 2, and in Figs. 8, 9, and 10, the lower end of the rod 153 terminates adjacent the slide 135, and this end is formed with an offset portion 155, to which is bolted an angularly disposed finger 156. This finger engages a roller 157 rotatably mounted between the side flanges 134 of the slide 135. Accordingly, when the latch 138 is depressed to release the slide, rotation of the dial 24 causes the finger 156 to force the slide inwardly. When the slide is restrained by engagement of the latch with the shoulder 143, the roller 157 holds the rod 153 against upward movement, and thus prevents operation of the dial 24. Lateral displacement of the rod 153 is prevented, and the rod is properly guided, by a tongue 158 engaging a roller 159 mounted on a pin 161 which extends between the fixed framing angles 117. It will be noted that this roller engages the rod on the opposite side from the roller 157.

It is intended that the gear ratio between the trundle staves 64 and the magazine gear 63 shall be such that one complete revolution of the dial 24 will advance the magazine sufficiently to bring one cell 48 into dispensing position. Inasmuch as the cam 92 is generally cylindrical, one-half a revolution of the dial will elevate the rod 153 to its maximum extent. The inclination of the finger 156 is therefore made such that the upward motion of the rod suffices to move the slide 135 a distance enabling the coin C to fall into the cash box 128, and thus clear the mechanism. As the dail 24 is rotated through the remaining half revolution, the magazine 41 continues to advance, but the rod 153 moves down to its original position. The spring 144 then returns the slide to maintain the roller 157 in engagement with the finger 156, and to align the slot 136 with the slot 127. The machine is then conditioned for a repetition of the cycle of operation.

A condition may arise when the demands on the vending apparatus will exhaust the bottles before the attendant can fill the magazine 41 with a new supply. It is therefore desirable to provide means forestalling operation of the machine by insertion of a coin when such condition occurs. According to the instant embodiment of this invention, such means may take the form of a cam, engageable by bottles in the magazine 41 to be moved into an inoperative position, but which, when not so engaged, shifts in such manner as to preclude operation of the coin-controlled mechanism.

Figure 11:
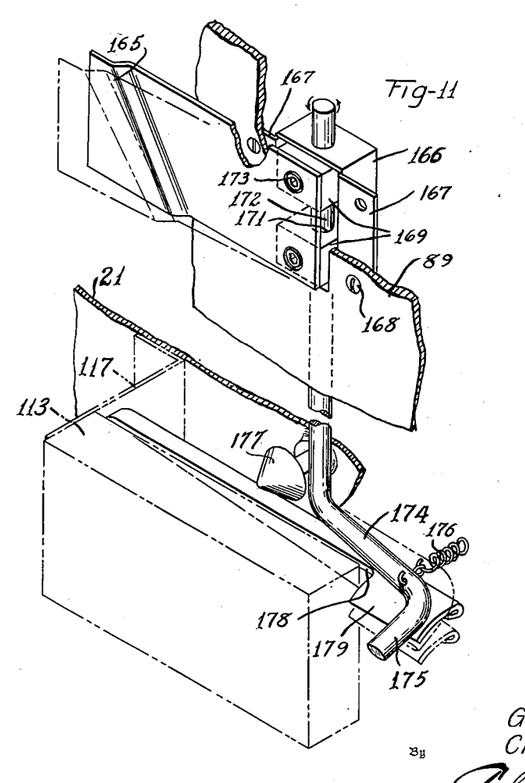
Fig. 11 is a perspective of means mounted on the inner side of the main door to decondition the machine when the bottle magazine is empty.

Referring to Figs. 2, 4, and 11, it will be observed that the access opening 61 in the door 21 is substantially aligned with a cam plate 165, formed with an inwardly extending offset section, and which therefore has something of the appearance of a waving flag. This offset section is sufficiently wide to make contact with the cap of the next bottle to be dispensed, whether that bottle is in the inner or outer periphery of cells. This "flag," or cam, is pivotally mounted in a sheet metal cup 166, secured to the inner face of the door panel 89, in the manner best shown in Fig. 11. The cup is rectilinear in form, and it is provided with an open front, and with outstanding flanges 167, by means of which it is secured to the panel 89 through screws 168. So much of the door panel as covers the open front of the cup is cut away to provide access and freedom of movement.

The cup 166 contains two rotatable blocks 169, to which the inner edge of the flag is welded or otherwise connected. The spacing of the blocks is such that, upon insertion into the cup, their upper and lower edges abut the top and bottom walls, and thereby support the flag with respect to vertical movement. The blocks are moreover provided with vertically disposed and aligned apertures 171, adapted to receive a rod 172, which is secured in assembled position by set screws 173, passing through the marginal portion of the flag and the blocks 169. The upper and lower walls of the cup are also drilled in alignment with the apertures 171, so that the rod 172 may be initially inserted and adjusted in a desired position. The rod 172 extends downwardly through the door 21 adjacent the coin control mechanism, where it makes a right angled turn and then again turns inwardly and downwardly, as indicated by the reference numerals 174 and 175. A tension spring 176, connected between the section 174 and the door 21, normally urges the rod 172 to rotate in a counterclockwise direction, to throw the offset portion of the cam plate 165 inwardly toward the magazine 41. As long as the magazine contains bottles, however, this tendency is overcome by engagement of the flag and a bottle cap.

Movement of the section 175 toward the coin control mechanism when the cam plate 165 is released is utilized to decondition the coin-actuated devices. While various means may be employed to accomplish this result, the inclusion of the coin detector 113 is here employed to effect a simple solution of the problem. It will be recalled, from Fig. 1, that such detector is provided with a push button 28 whose inward movement so affects the detector mechanism as to divert all coins into the return pocket 25. This result is obtained, in the specific form of detector herein referred to, by means of a pivoted lever arm 178 adapted to be engaged by a cam 177 formed on the inner end of the button 28.

According to the present embodiment of the invention, the lever arm 178 is formed with an angularly disposed end 179 adapted to be engaged by the inclined section 175 of the rod 172, when the rod is pulled toward the door 21 by the spring 176. Hence, when the flag 165 moves inwardly, because of the emptying of the magazine 41, the end piece 175 actuates the lever 178 in the same manner as the push button 28, to return all coins to the prospective purchaser. Obviously, if the door 26 is provided with a window, the edge of the flag may also be utilized as a visible signal.

It is believed that the mode of operation of the vending machine, and the functions performed by its several parts, has been explained as the description progressed, and therefore these matters need not be reiterated. It may be noted that, in contradistinction to other forms of vending machines, the present invention provides a device with a single main door through which all servicing is conducted, and that this door carries, in self-contained manner, all of the coin control mechanism as well as the manipulative portion of the magazine advancing mechanism. The bottle carrying magazine is of the horizontally mounted wheel type, thus facilitating the insertion and removal of the articles carried thereby, and permitting progressive advance through simple means.

While the invention has been described with respect to one practical embodiment, it is not intended that it be restricted thereto, nor to the precise details thereof, but that its scope should be commensurate with the various parts and combinations encompassed by the following claims.

We claim:

1. A vending machine comprising a cabinet having a compartment for the storage of articles to be dispensed, a main door covering the compartment, a magazine rotatably mounted in said compartment, said magazine being formed with circumferentially spaced cells each adapted to receive an article to be dispensed, an access opening in the main door in line with the path of said cells, gearing means mounted in the cabinet and operable from the face of the door when said door is closed to advance the magazine and thereby said cells to said opening, means included in said gearing means to restrain the magazine from rotation in one direction at all times but enabling said magazine to be rotated in the other direction, a latch member biased into engagement with said gearing means to restrain the magazine from rotation in said other direction, a spring-pressed rod having a cam adapted to lift said latch into disengaged position, said rod extending toward the door and being abutted thereby when the door is closed and shifted against its spring to disengage the latch, whereby upon opening the main door the latch is engaged with the gearing and the magazine is restrained from rotation by an unbalanced torque of articles carried therein.

2. A vending machine comprising a cabinet having a storage compartment and a machine compartment, a main door covering both compartments, an article magazine rotatably mounted in the storage compartment, an operating knob mounted on the outer face of the door and provided with a shaft extending into the storage compartment, gearing means interconnecting said shaft and magazine whereby upon rotation of the knob said magazine is advanced, a holding rod extending from said shaft through the door to a region covering the machine compartment, coin freed mechanism mounted on the door adjacent the lower end of said rod and engaging the same to prevent movement thereof until said coin freed mechanism is released, a coin chute in the door extending to said coin freed mechanism, and means connecting the upper end of said rod to said shaft whereby said knob and magazine cannot be operatively rotated until said coin freed mechanism is conditioned for release.

3. A vending machine comprising a cabinet having an upper storage compartment and a lower machine compartment, a main door covering both compartments, a magazine mounted in the storage compartment, a rotatable operating dial mounted on the outer face of the upper part of the door and on a shaft extending through the door, gearing means connecting said shaft and said magazine whereby the magazine may be advanced by rotation of the dial, a cam formed on the shaft adjacent the dial, a follower mounted on the cam and adapted to be raised and lowered as the dial is rotated one revolution, a rod connected to the follower and extending down through the door to a region opposite the machine compartment, a guide roller mounted in the lower portion of the door and engaging the lower end of the rod, a second roller engaging a finger on said rod, a shiftable slide member, said second roller being mounted on said slide member, spring means urging said slide member and the roller thereon into constant engagement with said finger, and a releasable latch engaging said slide to prevent movement thereof against the urge of said spring means, whereby the magazine is locked through said cam and rod against rotation until said latch is disengaged.

GREGG F. FORSTHOEFEL.
CHARLES H. NEWTON.

REFERENCES CITED

The following references are of record in the file of this patent:

UNITED STATES PATENTS

| Number | Name | Date |
|---|---|---|
| 916,795 | Shafer | Mar. 30, 1909 |
| 1,032,989 | Cawley | July 16, 1912 |
| 1,131,058 | Griswold | Mar. 9, 1915 |
| 1,731,352 | Schermack | Oct. 15, 1929 |
| 1,844,784 | Nau | Feb. 9, 1932 |
| 1,883,440 | Abbott | Oct. 18, 1932 |
| 1,893,708 | Kauffman et al. | Jan. 10, 1933 |
| 1,947,999 | McCormick et al. | Feb. 20, 1934 |
| 1,990,987 | Frick | Feb. 12, 1935 |
| 2,106,185 | Morin | Jan. 25, 1938 |
| 2,147,320 | Spare et al. | Feb. 14, 1939 |
| 2,151,858 | Masip et al. | Mar. 28, 1939 |
| 2,247,575 | De Stefani | July 1, 1941 |
| 2,283,681 | Madsen | May 19, 1942 |
| 2,371,316 | Rice et al. | Mar. 13, 1945 |
| 2,371,343 | Melchert | Mar. 13, 1945 |
| 2,474,053 | Johnson et al. | June 21, 1949 |